United States Patent [19]

Date et al.

[11] 4,247,189
[45] Jan. 27, 1981

[54] CAMERA WITH BUILT-IN ELECTRIC WIND-UP MECHANISM

[75] Inventors: Nobuaki Date, Kawasaki; Nobuaki Sakurada, Yokohama; Masami Shimizu, Tokyo; Hiroshi Aizawa, Kawasaki, all of Japan

[73] Assignee: Canon Kabushiki Kaisha, Tokyo, Japan

[21] Appl. No.: 76,583

[22] Filed: Sep. 18, 1979

[30] Foreign Application Priority Data

Sep. 22, 1978 [JP] Japan .............................. 53/117301
Sep. 25, 1978 [JP] Japan .............................. 53/117662

[51] Int. Cl.³ ...................... G03B 1/12; G03B 17/18
[52] U.S. Cl. .................................. 354/173; 354/289
[58] Field of Search .............................. 354/173, 289

[56] References Cited

U.S. PATENT DOCUMENTS

| 4,071,851 | 1/1978 | Johnson | 354/173 X |
| 4,201,463 | 5/1980 | Haregaya et al. | 354/173 X |

Primary Examiner—Michael L. Gellner
Attorney, Agent, or Firm—Toren, McGeady and Stanger

[57] ABSTRACT

A camera performing a film winding action with an electric wind-up mechanism and producing a winding completion signal upon completion of each film winding action. A counter and a discriminating circuit are reset by a back cover closing signal produced when a back cover of the camera is closed to have the counter count the winding completion signals. When both the winding completion signal and an output signal of the discriminating circuit representative of the initial state thereof are obtained, an electromagnetic release mechanism is automatically actuated to carry out an exposure action. Upon completion of the exposure action, the film winding action of the electric wind-up mechanism is performed. When the counter has counted a predetermined count value, the discriminating circuit is inverted by a count output of the counter to automatically render the electromagnetic release mechanism inoperative.

6 Claims, 4 Drawing Figures

CAMERA WITH BUILT-IN ELECTRIC WIND-UP MECHANISM

BACKGROUND OF THE INVENTION

1. Field of the Invention

This invention relates to a camera incorporating an electric film wind-up mechanism which automatically performs a film forwarding action without photographing in loading the camera with film.

2. Description of the Prior Art

In loading camera with a film, the fore end of the film is generally pulled out of a film container; the perforation of the film is engaged with a sprocket and the fore end portion of the film is wound on a reel shaft; the back cover of the camera is closed; and then a film forwarding operation without photographing is carried out by repeating film winding and shutter releasing several times respectively until an effective frame portion of the film is pulled out to an aperture part of the camera. Such a film forwarding operation does not directly relate to photographing and is tedious. Besides, if the shutter releasing operation is carried out without covering the lens with a lens cap or the like, unnecessary photographing is effected on the fore end portion of the film. Further, in the case of an aperture preference type automatic exposure controlling camera, if shutter release operations are carried out with a lens cap put on the lens, a long period of time would be wasted for an exposure action automatically performed during the non-photographing film forwarding operation.

To solve this problem, there have been provided some cameras of the type arranged to permit winding several frames in the fore end portion of the film without effecting shutter release after film loading and are provided with a blocking member which automatically stops the film winding action upon arrival of an effective frame of the film at the aperture part of the camera.

Even in cameras of this type, it is still necessary to manually carry out a film winding operation which is not directly related to photographing. Further, where an electric motor drive wind-up device is attached to the camera, film winding must be carried out by closely watching a film counter for the first several frames of the film, or the film will be wound up too much.

SUMMARY OF THE INVENTION

It is an object of this invention to provide a camera which incorporates therein an electromagnetic release mechanism and an electric motor drive wind-up mechanism to automatically perform an initial non-photographing film forwarding action when the camera is being located with a film.

It is another object of this invention to provide a camera which is capable of inhibiting unnecessary photographing on the fore end portion of a film without use of a lens cap when an initial non-photographing film forwarding action is performed.

These and further objects and features of the invention will become apparent in the following detailed description of embodiment examples taken in connection with the accompanying drawings.

DESCRIPTION OF THE PREFERRED EMBODIMENTS

Figure 1:
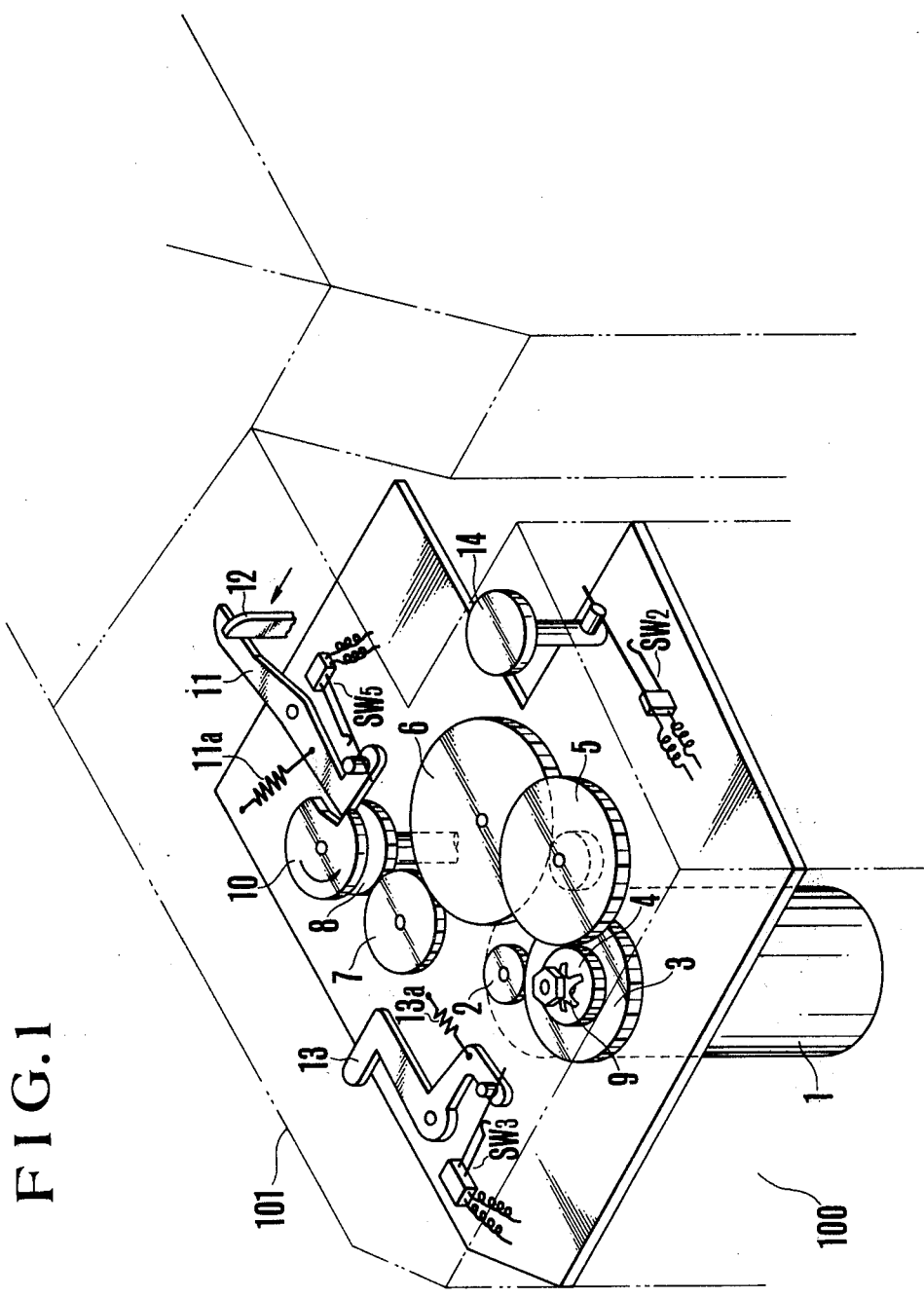
FIG. 1 is an oblique view showing the structural arrangement of a wind-up mechanism provided on an upper part of a camera as an embodiment of the invention.

Referring to FIG. 1 which shows a wind-up mechanism provided on the side of the upper cover of a camera, a winding motor 1 has a gear 2 attached to the driving shaft thereof. The rotation of the gear 2 is transmitted to a sprocket gear 8 through a gear train consisting of gear wheels 3, 4, 5, 6 and 7. Of these gear wheels, the gear wheels 3 and 4 form a double gear. There is provided a plate spring 9 which is arranged to friction couple the two gear wheels 3 and 4 to each other. A winding stopping plate 10 is arranged to rotate together with the sprocket gear 8 and to be locked by a winding stopping lever 11 upon completion of a winding action. A spring 11a urges the winding stopping lever 11 in the clockwise direction. The opening and closing operation of a motor control switch SW5 is controlled in association with this winding stopping lever 11. A release lever 12 is arranged to release the winding stopping lever 11 from its locking engagement and moves in the direction of the arrow when a rear diaphragm of the shutter travels. There is provided a signal lever 13 which works in association with a back cover to open and close a back cover signal switch SW3. The signal lever 13 is being urged in the counterclockwise direction by a spring 13a. A reference numeral 14 indicates a release button. A depressing operation on this release button 14 causes a release switch SW2 to close.

Figure 2:
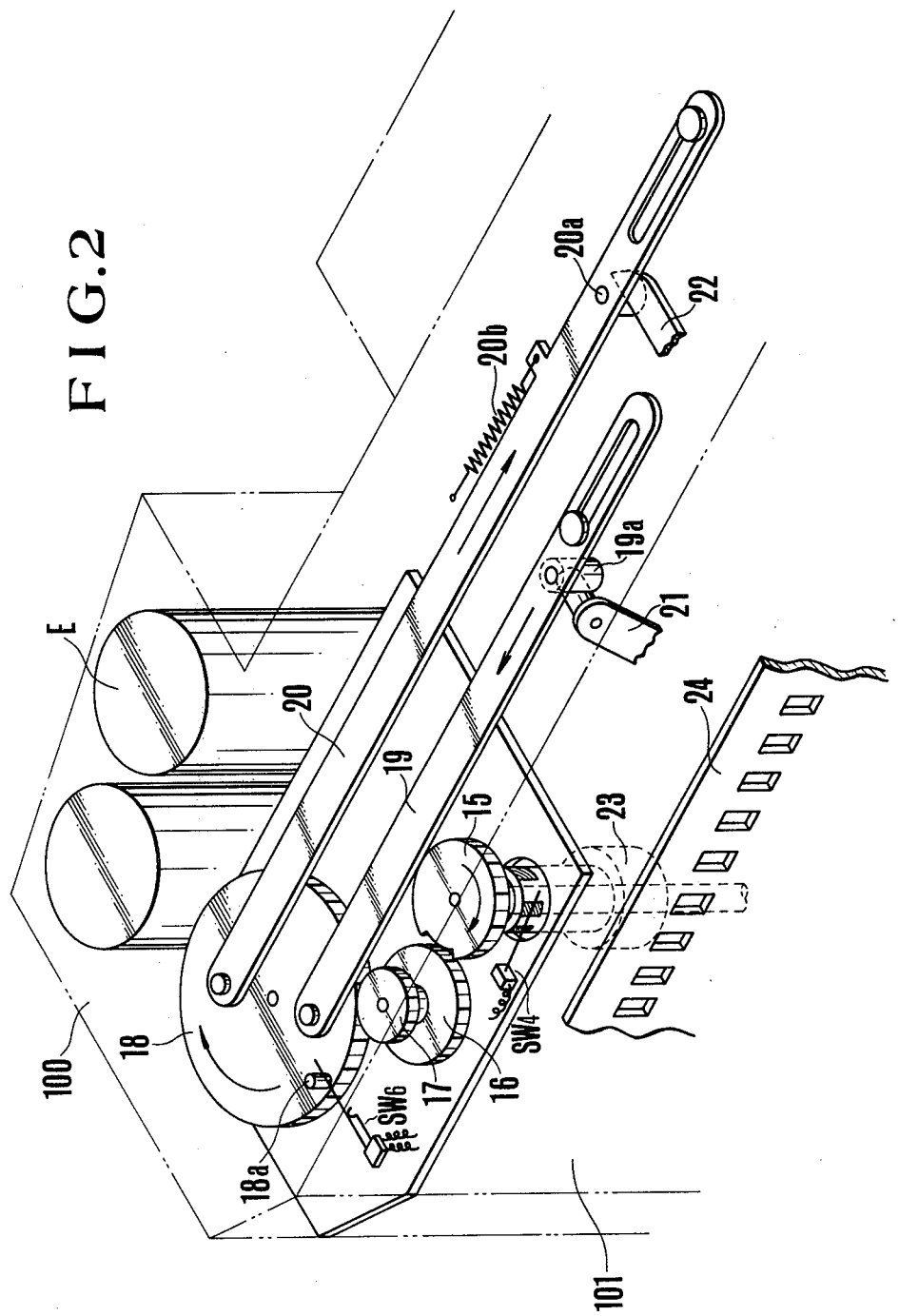
FIG. 2 is an oblique view showing the structural arrangement of a wind-up mechanism provided on a lower part of the camera shown in FIG. 1.

In FIG. 2, which shows a wind-up mechanism provided on the side of the bottom cover of a camera, there is provided a notched gear which is arranged to rotate together with a sprocket gear 8. The movement of this gear 15 is transmitted to a winding disc 18 through gear wheels 16 and 17 which form a double gear. The rotation of the winding disc 18 causes sliding plates 19 and 20 to slide to the left and to the right respectively. The slidings plate 19 is arranged to charge a charge lever 21 of a shutter mechanism, which is not shown, through a pin 19a. The sliding plate 20 is arranged to charge, through a pin 20a, a charge lever 22 of an aperture control mechanism and a mirror operating mechanism which are not shown. The sprocket gear 8 has a film feeding detection drum arranged on the shaft thereof to rotate when a film 24 is being moved forward. At the end of the drum 23, there are provided conductive parts and insulating parts which are alternately arranged with a switch SW4 in contact with them. During film feeding, the switch SW4 thus repeats turning on and off. The winding disc 18 is provided with a pin 18a which is arranged to open and close a winding completion safety switch 6. Further, in FIGS. 1 and 2, two-dot chain lines indicate a camera body which is provided with a back cover 101. A reference symbol E indicates a power source battery.

Figure 3:
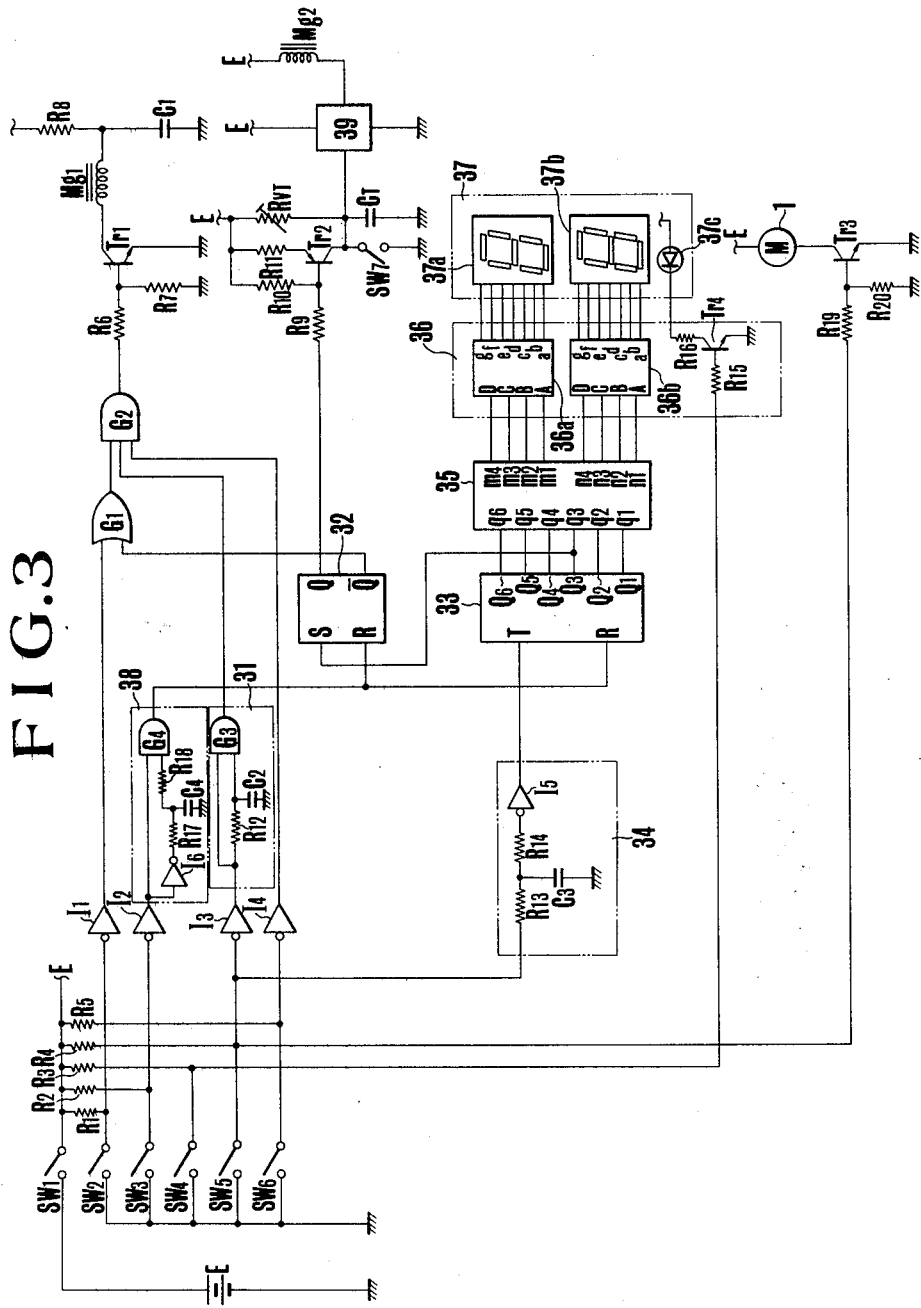
FIG. 3 is a circuit diagram showing a control circuit of the camera shown in FIGS. 1 and 2.
Figure 4:
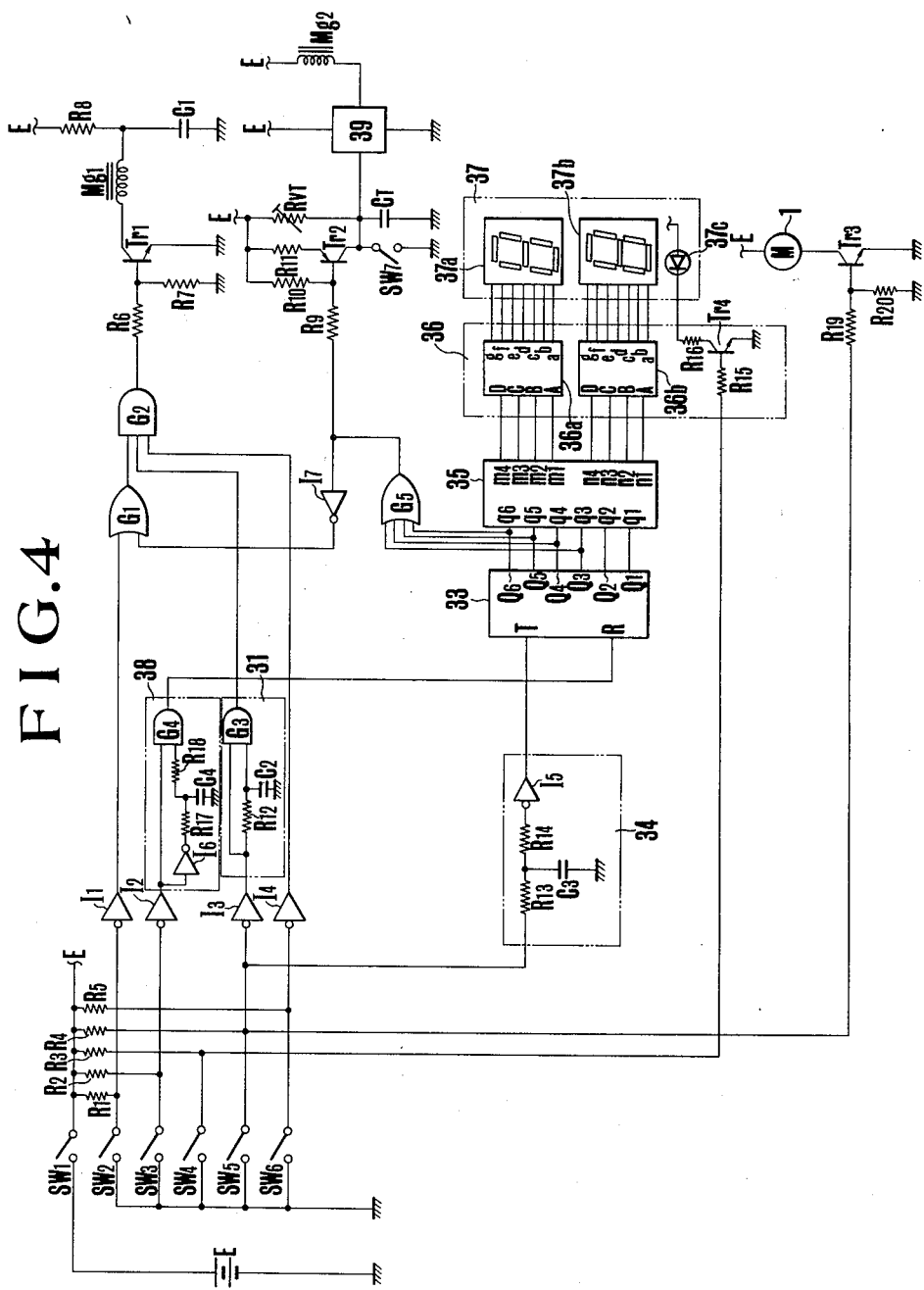
FIG. 4 is a circuit diagram showing a modification example of the circuit shown in FIG. 3.

A winding control circuit of the winding mechanism shown in FIGS. 1 and 2 is as illustrated in FIG. 3. Referring to FIG. 3, a reference symbol E indicates a power source battery; SW2 indicates a release switch which is arranged to be turned on by a release button when the latter is operated; SW3 indicates a back cover signal which is turned on when the back cover is closed; Sw4 indicates a film feeding switch which turns on for feeding the film; SW5 indicates a motor control switch; SW6 indicates a winding completion safety switch; R1 through R5 indicate pull-up resistors; I1, I2, I3 and I4 indicate inverters; G1 indicates an OR gate; G2 indicates an AND gate; Tr1, Tr2 and Tr3 indicate transistors; Mg1 indicates a releasing magnet which performs a release action when electric power is supplied from a capacitor C1; R6, R7 and R8 indicate resistors; Mg2 indicate a shutter control magnet; RVT indicates a variable resistor for shutter time control; CT indicates a capacitor for shutter time control; R9, R10 and R11 indicate resistors; and SW7 indicates a trigger switch for operating a time constant circuit. A delay circuit 31 is formed by an AND gate G3, a resistor R12 and a capacitor C2. A reference numeral 32 indicates an R-S flip-flop circuit; 33 indicates a counter; 34 indicates a chattering preventing circuit which is composed of resistors R13 and R14, a capacitor C3 and an inverter I5; and 35 indicates a binary coded decimal converter; 36 indicates a circuit which is provided with two decoder drivers 36a and 36b and a switching transistor Tr4. The decoder driver 36a is arranged to express the number of tens and the decoder driver 36b the number of units. Reference numerals R15 and R16 indicate resistors; 37 indicates a display circuit which is provided with two 7-segment elements 37a and 37b and a light emitting diode 37c; 38 indicates a differentiation circuit consisting of an AND gate G4, an inverter I6, resistors R17 and R18 and a capacitor C4; 39 indicates a Schmitt circuit; and 1 indicates a winding motor. The winding motor 1 is controlled by a switch SW5. Reference symbols R19 and R20 indicate resistors.

The camera having a built-in electric motor drive winding mechanism which is provided with the automatic non-photographing film forwarding device of the present invention arranged as described in the foregoing operates as follows: When the circuit is supplied with an electric power with the power source switch SW1 turned on, if the camera is in a state of not having completed film winding, i.e. if the winding stopping lever 11 has not been inserted into the notched part, the switch SW5 is in a state of being off and the transistor Tr3 is turned on to cause the motor 1 to rotate; and there immediately obtained a state of having completed a winding action. Then, the motor control switch SW5 is turned on by the rotation of the winding stopping lever 11. The transistor Tr3 is turned off by this and the motor 1 comes to a stop. After this, when the back cover is opened to load the camera with a film and then is closed, the signal lever 13 rotates clockwise against the force of the spring 13a to turn on the back cover signal switch SW3. The R-S flip-flop circuit 32 and the counter 33 are reset by a pulse coming from the back cover signal switch SW3 through the inverter I2 and the differentiation circuit 38. With the flip-flop circuit 32 reset, a signal "1" of a high level is produced from the terminal Q of the flip-flop circuit 32. The high level signal "1" is supplied to the AND gate G2 through the OR gate G1. Since the camera is then in a state of having completed a winding action, a signal from the motor control switch SW5 has been supplied to the AND gate G2 as signal "1" through the inverter I2 and the delay circuit 31 while a signal from the winding completion safety switch SW6 also has been supplied to the AND gate as signal "1" through the inverter I4, the AND gate G2 produces a signal "1", which renders the transistor Tr1 conductive to permit power supply to the release magnet Mg1. The magnet Mg1 then performs a release action to cause the front diaphragm of the shutter to travel.

However, at this time, the Q output of the flip-flop circuit 32 is a low level signal "0". Therefore, this allows the transistor Tr2 of the shutter control circuit to be rendered conductive to have the time constant capacitor CT quickly charged; and the shutter control magnet Mg2 is controlled through the Schmitt circuit 39 at a timing faster than the maximum shutter time irrespective of a preset shutter time value. The shutter is thus operated in a state of having the diaphragms thereof closed. After the operation of the shutter, the release lever 12 moves in the direction of arrow in association with the movement of the rear diaphragm of the shutter to cause the winding stopping lever 11 to rotate counterclockwise against the force of the spring 11a. With the lever 11 rotated, the motor control switch SW5 is turned off to make the transistor Tr3 conductive and the motor 1 begins to rotate.

The rotation of the motor 1 is transmitted to the sprocket gear 8 through the reduction gear wheels 3, 4, 5, 6 and 7. The notched gear 15 is then caused to rotate clockwise and this, in turn, causes the winding disc 18 to rotate clockwise through the double gear 16 and 17. The clockwise rotation of the winding disc 18 then causes the sliding plates 19 and 20 to move in the directions of arrows respectively to charge the shutter and diaphragm aperture control mechanisms. Upon completion of charging, the notched gear 15 and the double gear 16 and 17 are disconnected from each other and the winding disc 18 is caused to rotate by the force of the spring 20b counterclockwise or in the direction reverse to the direction of the arrow. Further, the winding stopping plate 10, which is arranged in one unified body with the sprocket gear 8, is locked by the winding stopping lever 11 and the motor control switch SW5 is turned on to cut off power supply to the motor. With the power supply cut off, the force of inertia urges the motor to continue rotating. This energy of motion, however, is dispelled by slippage of the friction coupling effected by the spring 9 at the double gear 3 and 4, so that the winding stopping lever 11 can be saved from being overloaded. To allow the film to settle in position after completion of film winding, the delay circuit 31 works to retard the signal of the motor control switch SW5 for a predetermined period of time after film winding and before it is supplied to the AND gate G2.

Further, if shutter release is effected before the sliding plates have completely returned to their original positions, the internal mechanisms of the camera would perform erroneous actions. To avoid such difficulties there is provided winding completion safety switch SW6 which is arranged to be turned on after the sliding plates have completely resumed their original position. Therefore, when the motor control switch SW5 is turned on, a winding completion signal produced by this is supplied to the counter 33 through the inverter I3 and the chattering preventing circuit 34. The counter then counts up by one in response to the winding completion signal.

Following this, the AND gate G2 again produces a release signal. With the shutter release action and the film wind-up action repeated several times in this manner, when the Q2 output of the counter becomes the signal "1", the signal "1" is supplied to the input terminal S of the flip-flop circuit 32 and the $\overline{Q}$ signal of the flip-flop circuit 32 becomes "0". Therefore, the OR gate G1 no longer produces "1". The motor is thus kept in a stopped state under the winding completed condition unless the release switch SW2 is turned on.

As for the shutter control circuit, when the Q output of the flip-flop circuit 32 becomes "1", the transistor Tr2 is turned off to have the shutter time control resistor RVT control the shutter time.

The result of counting by the counter 33 is displayed by the display circuit 37 through the converter 35 and the decoder drivers 36a and 36b. However, since the film feeding switch SW4 repeatedly turns on and off during film feeding, the transistor Tr4 is turned on and off to cause the light emitting diode 37c to flicker to clearly indicate that the film is being wound up.

In the embodiment example described in the foregoing, the flip-flop circuit 32 is employed as a discriminating circuit and is arranged to judge whether or not the counter 33 has counted a predetermined value. However, it is to be understood that the invention is not limited in its application to such use and an OR gate G5 may be used in place of the flip-flop circuit in the same manner. In that case, the output terminals Q3 through Q6 of the counter 33 are connected to the OR gate G5; the output of the OR gate G5 is then arranged to be applied to the above stated OR gate G1 through the inverter I7.

As described in detail in the foregoing, the camera having the built-in electric motor drive winding mechanism of the present invention is arranged to have a frame counter reset by closing of the back cover of the camera after the camera is loaded with film; and, following this, a non-photographing film forwarding operation is automatically performed on the fore end portion of the film by automatically repeating a shutter releasing action until a predetermined number of frames in the fore end portion of the film are counted by the counter. Further, during this non-photographing film forwarding operation, the shutter is arranged to operate in a state of having shutter diaphragms closed. Therefore, in the case where the camera has an automatic film wind-up mechanism driven by an electric motor incorporated therein, the photographer is saved from the trouble of carrying out non-photographing operations. In addition to that, the fore end portion of the film is saved from being unnecessarily exposed to light and the possibility of having useless exposure actions performed at the time of loading the camera with a film is also eliminated. The invention is, therefore, highly advantageous particularly for a camera incorporating an electric motor drive device therein. Further, in the invented camera having a built-in electric motor drive wind-up mechanism, motor torque is efficiently utilized by the arrangement of the sprocket shaft rotated by the electric wind-up mechanism; a notched gear provided at the sprocket shaft and arranged to rotate the winding disc back and forth; and the sliding plates which are operated by the winding disc. In accordance with the invented arrangement, therefore, the number of power source batteries required can be held to a minimal quantity and the length of time required for film winding can be shortened to a sufficient degree with the use of a low voltage, so that a very compact camera of high performance can be obtained.

What is claimed is:

1. A camera with a built-in electric film wind-up mechanism comprising:
    a wind-up mechanism;
    driving means for driving said wind-up mechanism;
    first signal producing means for producing a winding completion signal upon completion of each winding action of said wind-up mechanism and for producing a winding signal upon completion of each exposure action;
    switching means which controls the operation of said driving means, said switching means being arranged to be turned on by said winding signal to actuate said driving means and to be turned off by said winding completion signal to render said driving means inoperative;
    second signal producing means for producing a back cover closing signal in response to closing of a back cover of the camera;
    a counter which is brought back into its initial state by said back cover closing signal, said counter being arranged to count said winding completion signals; and
    release means for causing an exposure action to take place, said release means being arranged to operate when both a counter output which is produced before a predetermined count value is counted by said counter and said winding completion signal are applied thereto.

2. A camera with a built-in electric film wind-up mechanism comprising:
    a wind-up mechanism;
    driving means for driving said wind-up mechanism;
    first signal producing means for producing a winding completion signal upon completion of each winding action of said wind-up mechanism and for producing a winding signal upon completion of each exposure action;
    switching means which controls the operation of said driving means, said switching means being arranged to be turned on by said winding signal to actuate said driving means and to be turned off by said winding completion signal to render said driving means inoperative;
    second signal producing means for producing a back cover closing signal in response to closing of a back cover of the camera;
    a counter which is brought back into its initial state by said back cover closing signal, said counter being arranged to count said winding completion signals; and
    discriminating means for judging whether or not the count value counted by said counter exceeds a predetermined value, said discriminating means being arranged to have the output thereof inverted when the count value of said counter exceeds said predetermined value;
    third signal producing means for producing a release start signal in response to a release operation;
    gate means which is arranged to have the output of said discriminating means and said release start signal applied thereto; and
    release means for causing an exposure action to take place, said release means being arranged to operate when said winding completion signal and the output of said discriminating means which is produced prior to its inversion and coming from said gate means are applied thereto, or when said release start signal is applied thereto.

3. A camera according to claim 2, wherein said discriminating means is a flip-flop circuit, which is arranged to be reset by said back cover closing signal.

4. A camera according to claim 2, wherein said discriminating means is provided with an OR gate.

5. A camera according to claim 2, further including a first shutter control means for controlling the shutter of the camera and a second shutter control means which operates to have the shutter controlled without being opened, said second shutter control means being arranged to be rendered operative by the output of said discriminating means produced prior to its inversion.

6. A camera according to claim 2, further including switch means which turns on and off as film winding actions are performed; and display means which flickers as said switch means turns on and off.

* * * * *